(12) United States Patent
Walter

(10) Patent No.: US 10,378,626 B2
(45) Date of Patent: Aug. 13, 2019

(54) CVT DRIVE TRAIN

(71) Applicant: SCHAEFFLER TECHNOLOGIES AG & CO. KG, Herzogenaurach (DE)

(72) Inventor: Bernhard Walter, Oberkirch-Haslach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/301,250

(22) PCT Filed: Mar. 24, 2015

(86) PCT No.: PCT/DE2015/200187
§ 371 (c)(1),
(2) Date: Sep. 30, 2016

(87) PCT Pub. No.: WO2015/149796
PCT Pub. Date: Oct. 8, 2015

(65) Prior Publication Data
US 2017/0023113 A1    Jan. 26, 2017

(30) Foreign Application Priority Data
Apr. 1, 2014  (DE) .................. 10 2014 206 190

(51) Int. Cl.
*F16H 45/02*    (2006.01)
*F16H 37/02*    (2006.01)
(Continued)

(52) U.S. Cl.
CPC ......... *F16H 37/021* (2013.01); *F16H 37/022* (2013.01); *F16H 37/0813* (2013.01);
(Continued)

(58) Field of Classification Search
CPC .. F16H 37/021; F16H 37/022; F16H 37/0813; F16H 2037/026; F16H 45/02; F16H 2045/002; F16H 2045/0294
See application file for complete search history.

(56) References Cited

U.S. PATENT DOCUMENTS 4,577,737 A    3/1986  Herchenbach et al.
4,631,979 A *  12/1986 Tamura .................. F16D 47/06
                                                    192/3.31
(Continued)

FOREIGN PATENT DOCUMENTS

CN    1578890 A    2/2005
CN    1662752 A    8/2005
(Continued)

*Primary Examiner* — David R Morris
(74) *Attorney, Agent, or Firm* — Kevin L. Parks

(57) ABSTRACT

A CVT drive train including an input drive is disclosed. A torque converter is downstream from the input drive in a power flow direction and contained within a torque converter housing, where the torque converter serves as a starting element. A disconnect clutch is contained within the torque converter housing along with a converter bridging clutch. The bridging clutch is combined with the disconnect clutch such that the impeller shell acts as a friction member for both clutches. In this way, the bridging clutch is positioned between a turbine shell and an impeller shell and the disconnect clutch is positioned between the impeller shell and housing of the torque converter. A continuously variable variator is operatively connected to and arranged downstream from the torque converter, and a rotation reversing device is downstream of the variator to enable a shift between a neutral position of the drive train and one of a forward driving position and a reverse driving position.

9 Claims, 2 Drawing Sheets

(51) Int. Cl.
*F16H 37/08* (2006.01)
*F16H 45/00* (2006.01)

(52) U.S. Cl.
CPC ....... *F16H 45/02* (2013.01); *F16H 2037/026* (2013.01); *F16H 2045/002* (2013.01); *F16H 2045/0205* (2013.01); *F16H 2045/0294* (2013.01)

(56) References Cited

U.S. PATENT DOCUMENTS

| | | | | |
|---|---|---|---|---|
| 4,765,200 | A | * | 8/1988 | Koshimo ................ F16D 47/06 192/105 BA |
| 4,817,458 | A | | 4/1989 | Akutagawa et al. |
| 4,843,908 | A | * | 7/1989 | Koshimo ................ F16D 47/06 192/3.26 |
| 4,852,427 | A | * | 8/1989 | van der Veen ........ F16H 37/022 475/52 |
| 4,876,920 | A | * | 10/1989 | Eichenberger ........ F16H 37/021 474/28 |
| 4,876,922 | A | * | 10/1989 | Koshimo ................ F16D 47/06 192/3.25 |
| 6,241,635 | B1 | * | 6/2001 | Schmid .................. F16H 55/56 474/11 |
| 6,494,303 | B1 | * | 12/2002 | Reik ....................... F16H 45/02 192/212 |
| 7,445,099 | B2 | * | 11/2008 | Maucher ................ F16D 47/06 192/3.26 |
| 9,285,030 | B2 | * | 3/2016 | Lindemann ............ F16H 45/02 |
| 9,366,328 | B2 | * | 6/2016 | Yoshino ................ F16H 37/021 |
| 9,394,981 | B2 | * | 7/2016 | Lindemann ............ F16H 45/02 |
| 9,523,400 | B2 | * | 12/2016 | Endo ..................... F16H 61/702 |
| 9,810,304 | B2 | * | 11/2017 | Lindemann ............ F16H 45/02 |
| 2003/0109346 | A1 | | 6/2003 | Niikura et al. |
| 2006/0086584 | A1 | * | 4/2006 | Maucher ................ F16D 47/06 192/3.29 |
| 2013/0230385 | A1 | * | 9/2013 | Lindemann ............ F16D 33/18 415/122.1 |
| 2015/0021137 | A1 | * | 1/2015 | Lindemann ............ F16H 45/02 192/3.29 |
| 2015/0068856 | A1 | * | 3/2015 | Lindemann ............ F16H 45/02 192/3.25 |
| 2015/0087452 | A1 | * | 3/2015 | Yoshino ................ F16H 37/021 474/1 |
| 2016/0084364 | A1 | * | 3/2016 | Ramsey ................. F16H 45/02 415/123 |
| 2016/0230822 | A1 | * | 8/2016 | Endo ..................... F16H 61/702 |
| 2016/0273636 | A1 | * | 9/2016 | Lindemann ............ F16H 45/02 |
| 2016/0290457 | A1 | * | 10/2016 | Walter ................... F16H 37/022 |
| 2016/0312869 | A1 | * | 10/2016 | Walter ................... F16H 37/021 |

FOREIGN PATENT DOCUMENTS

| | | |
|---|---|---|
| CN | 102782365 A | 11/2012 |
| GB | 1372507 A | 10/1974 |
| JP | S61294247 A | 12/1986 |

\* cited by examiner

US 10,378,626 B2

CVT DRIVE TRAIN

CROSS-REFERENCE TO RELATED APPLICATION

This application is the U.S. national phase patent application under 35 U.S.C. § 371 of International Patent Application Serial No. PCT/DE2015/200187, having an international filing date of 24 Mar. 2015, and designating the United States, which claims priority based upon German Patent Application No. DE 10 2014 206 190.3, filed on 1 Apr. 2014, the entire contents of each of which applications are hereby incorporated by reference herein to the same extent as if fully rewritten.

BACKGROUND OF THE INVENTION

Field of the Invention

The present invention relates to a CVT drive train having an input drive, a torque converter as a starting element, a disconnect clutch, a rotation reversing device, and a continuously variable variator. In addition, the invention relates to a method for operating such a CVT drive train.

A CVT drive train of this type is known from U.S. Pat. No. 4,817,458. In the known CVT drive train, the disconnect clutch is positioned between the torque converter and the rotation reversing device on the input side of the continuously variable variator. The term CVT refers to a stepless transmission; the letters CVT stand for continuously variable transmission.

An object of the present invention is to improve a drive train having an input drive, a torque converter as a starting element, a disconnect clutch, a rotation reversing device, and a continuously variable variator, in particular with regard to the required construction space.

SUMMARY OF THE INVENTION

The object is fulfilled with a CVT drive train having an input drive, a torque converter as a starting element, a disconnect clutch, a rotation reversing device, and a continuously variable variator, characterized in that the disconnect clutch is integrated into the torque converter. That makes it possible, in a simple way, on the one hand to uncouple from the rotation reversing device a torque provided by means of the torque converter prior to a switchover. On the other hand, because of the integration of the disconnect clutch in the torque converter, no construction space is needed for the disconnect clutch between the torque converter and the continuously variable variator in the CVT drive train according to the present invention. An additional separate clutch outside of the torque converter can therefore be completely eliminated.

A preferred exemplary embodiment of the present CVT drive train is characterized in that the disconnect clutch in the torque converter is operable with slip. That enables the driving dynamics of a motor vehicle equipped with the CVT drive train to be improved in certain driving situations by a brief, calculated increase in engine speed.

Another preferred exemplary embodiment of the present CVT drive train is characterized in that the torque converter is designed as a multi-function converter, which contains a converter bridging clutch in addition to the disconnect clutch. The converter bridging clutch serves beneficially, in particular, to block or bridge the torque converter, for example after a driving-off procedure. The converter bridging clutch is also known as a lockup clutch.

Another preferred exemplary embodiment of the present CVT drive train is characterized in that the converter bridging clutch is combined within the torque converter with the disconnect clutch. The converter bridging clutch is preferably positioned between a turbine and an impeller of the torque converter. The disconnect clutch is preferably positioned between the impeller and a housing of the torque converter. The two clutches are preferably designed as friction clutches having friction linings. Among other things, that provides the advantage that both clutches can be operated with slip.

Another preferred exemplary embodiment of the present CVT drive train is characterized in that the rotation reversing device is implemented as a reversing gear with a claw clutch, which makes it possible to shift between a neutral position N, a forward driving position D, and a reverse driving position R. To shift among the various positions of the rotation reversing device, the latter is decoupled from the input drive with the help of the disconnect clutch that is integrated into the torque converter.

Another preferred exemplary embodiment of the present CVT drive train is characterized in that the rotation reversing device includes a synchronizing device. Uncoupling the torque converter from the rotation reversing device simplifies the synchronization prior to switching over the rotation reversing device.

Another preferred exemplary embodiment of the present CVT drive train is characterized in that the rotation reversing device is located on an output side of the variator, between a variator output and a differential. The rotation reversing device is positioned, for example, on an output shaft of the continuously variable variator. The rotation reversal is preferably carried out with an additional shaft.

Another preferred exemplary embodiment of the present CVT drive train is characterized in that a torque sensor is positioned at least partially in an intermediate space between the torque converter and the input side of the variator. In the previously known CVT drive train described earlier, the disconnect clutch is positioned in the intermediate space between the torque converter and the input side of the variator. By integrating the disconnect clutch into the torque converter, the intermediate space can be used advantageously, either entirely or partially, to accommodate the torque sensor.

In addition, the present invention relates to a method for operating a previously described CVT drive train. During operation of the CVT drive train, the disconnect clutch integrated into the torque converter serves advantageously to uncouple the rotation reversing device from the input drive prior to switching over. That decouples a converter torque which impedes or prevents synchronization.

BRIEF DESCRIPTION OF THE DRAWINGS

Additional advantages, features, and details of the invention can be seen from the following description, in which various exemplary embodiments are described in detail with reference to the drawings. The drawing figures show the following.

DESCRIPTION OF THE PREFERRED EMBODIMENTS

Figure 1:
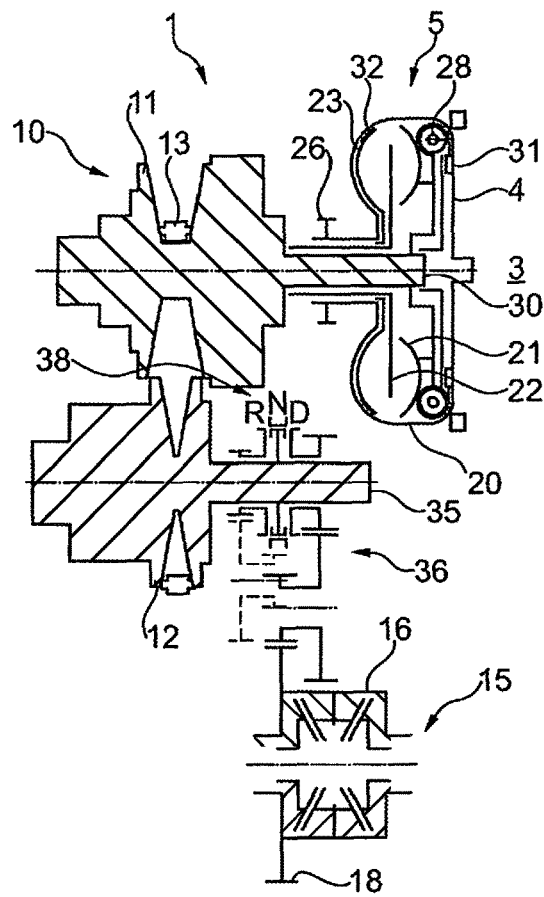
FIG. 1 shows a simplified representation of a CVT drive train according to the present invention in a longitudinal cross-sectional view.
Figure 2:
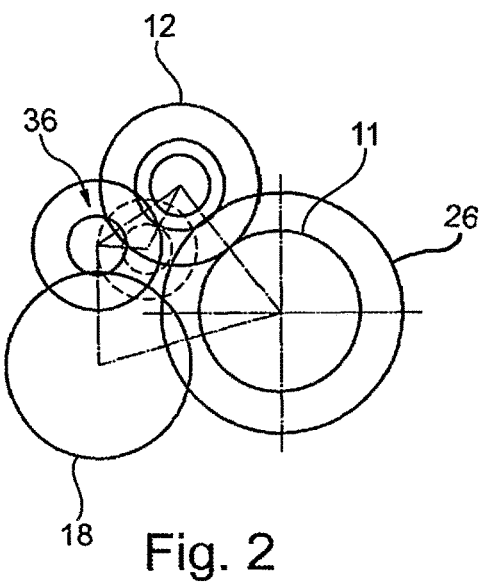
FIG. 2 shows the CVT drive train of FIG. 1 in a transverse cross-sectional view.
Figure 3:
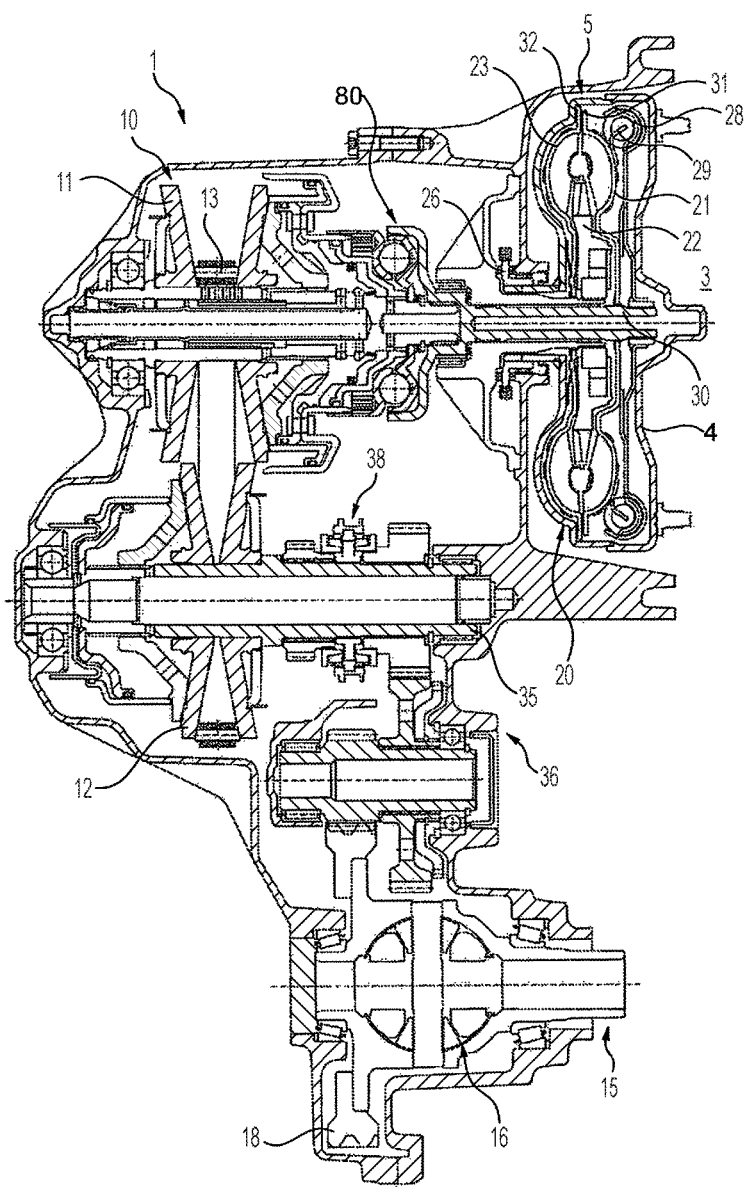
FIG. 3 shows an exemplary embodiment of a CVT drive train according to the present invention in a longitudinal cross-sectional view.

FIGS. 1 through 3 show a CVT drive train 1 according to the present invention having a CVT transmission. The CVT drive train 1 includes an input drive 3. The input drive 3 is, for example, a combustion machine, which is also referred to as an internal combustion engine when used in a motor vehicle. In FIGS. 1 and 3, only an input part 4 of the input drive 3 is visible, which is non-rotatably connected to a crankshaft of the internal combustion engine, for example by means of a flex plate.

Starting to drive a motor vehicle equipped with the CVT drive train 1 is enabled by a starting element 5. The starting element 5 is implemented as a torque converter. A torque from the input drive 3 is transmitted through the torque converter 5 to a variator input of the variator 10.

The variator 10 includes a conical disk set 11 on the input side and a conical disk set 12 on the output side. The two conical disk sets 11 and 12 are coupled with each other by an endless torque-transmitting means 13. The endless torque-transmitting means 13 is, for example, a special chain.

By means of the two conical disk sets 11 and 12, the transmission ratio between the input drive 3 and an output drive 15 can be adjusted continuously. The output drive 15 includes at least one driven vehicle wheel (not shown).

Normally, the output drive 15 includes at least two driven vehicle wheels. An equalizing transmission 16, also referred to as a differential, serves to distribute the provided torque to the two driven vehicle wheels. The differential 16 includes a spur gear 18.

The torque converter 5 includes a housing 20. The housing 20 of the torque converter 5 is firmly connected to the input part 4 of the CVT drive train 1. Located in the housing 20 of the torque converter 5 are a turbine 21, a diffuser 22, and an impeller 23. The construction and the function of a torque converter are disclosed, for example, in the international published unexamined application WO 2004/003400 A1.

A torsional vibration damping device 28 is integrated into the torque converter 5. The torsional vibration damping device 28 is non-rotatably connected or connectible on the input side to the input part 4. On the output side, the torsional vibration damping device 28 is connected to an input shaft 30 of the variator 10. In FIG. 3 that connection is made by means of a flange 29, or to input shaft 30 of the variator 10 by means of the turbine 21.

Furthermore, a converter bridging clutch 31 and a disconnect clutch 32 are integrated into the torque converter 5. The converter bridging clutch 31 serves to block or bridge the torque converter 5. The input part 4 of the CVT drive train 1 can be connected directly to the input shaft 30 of the variator 10 through the engaged converter bridging clutch 31.

The disconnect clutch 32 makes it possible to uncouple the input shaft 30 of the variator 10 from the input part 4 of the CVT drive train 1. That enables the torque converter 5 to be uncoupled from the input drive 3.

The variator 10 has an output shaft 35 on the output side. A rotation reversing device 36 is operatively connected to the output shaft 35 of the variator 10.

The rotation reversing device 36 includes a claw clutch 38, which enables shifting between a neutral position N, a reverse driving position R, and a forward driving position D.

The rotation reversing device 36 including the claw clutch 38 is operatively connected with the differential 16 between the output shaft 35 of the variator 10 by the spur gear 18.

The circles shown in FIG. 2 make the construction of a CVT transmission clear. A circle 26 represents the gear 26 shown in FIGS. 1 and 3, respectively. The center point of the circle 26 in FIG. 2 represents the center point of an input drive crankshaft.

In the CVT drive train 1 shown in FIG. 1 the converter bridging clutch 31 is positioned between the torsional vibration damping device 28 and the input part 4. The disconnect clutch 32 is positioned between the impeller 23 and the housing 20 of the torque converter 5.

In the CVT drive train 1 shown in FIG. 3, the converter bridging clutch 31 is combined with the disconnect clutch 32. The converter bridging clutch 31 is positioned between the turbine 21 and the impeller 23. The disconnect clutch 32 is positioned between the impeller 23 and the housing 20.

Furthermore, the variator 10 of the CVT drive train 1 in FIG. 3 is equipped with a torque sensor 80. The torque sensor 80 is positioned in an intermediate space between the input disk set 11 of variator 10 and the gear 26.

The gear 26 shown in FIG. 3, like the gear 26 in the CVT drive train 1 shown in FIG. 1, serves, for example, to drive a pump (not shown). The gear 26 is therefore also referred to as a pump gear.

What is claimed is:

1. A continuously variable transmission (CVT) drive train comprising:
    an input drive;
    a torque converter as a starting element, wherein the torque converter is contained within a torque converter housing, the torque converter further including:
        an impeller including an impeller shell and at least one impeller blade connected to the impeller shell;
        a turbine including a turbine shell and at least one turbine blade connected to the turbine shell;
        a disconnect clutch positioned between the torque converter housing and the impeller shell, wherein the disconnect clutch includes a portion of the impeller shell located radially outward of the at least one impeller blade; and
        a bridging clutch positioned between the turbine shell and the impeller shell, wherein the bridging clutch includes the portion of the impeller shell and a portion of the turbine shell located radially outward of the at least one turbine blade, wherein the portion of the impeller shell directly contacts the portion of the turbine shell when the bridging clutch is closed, and wherein the portion of the impeller shell located radially outward of the at least one impeller blade is a friction member for both the disconnect clutch and the bridging clutch;
    a rotation reversing device; and
    a continuously variable variator.

2. A CVT drive train according to claim 1, wherein the disconnect clutch within the torque converter housing is operable with slip.

3. A CVT drive train according to claim 1, wherein the torque converter is a multi-function torque converter.

4. A CVT drive train according to claim 3, wherein the disconnect clutch within the torque converter is operable with slip.

5. A CVT drive train according to claim 1, wherein the rotation reversing device is a reversing gear including a claw clutch for shifting between a neutral position N, a forward driving position D, and a reverse driving position R.

6. A CVT drive train according to claim 1, wherein the rotation reversing device includes a synchronization device.

7. A CVT drive train according to claim 1, wherein the rotation reversing device is located on an output side of the variator between a variator output and a differential.

8. A CVT drive train according to claim 1, including a torque sensor positioned in an intermediate space between the torque converter and the variator.

9. A method for operating a continuously variable transmission (CVT) drive train having an input drive, a torque converter including an impeller and a turbine, a rotation reversing device, and a continuously variable variator, the method comprising:

operating a disconnect clutch positioned within a housing of the torque converter between the housing and an impeller shell to uncouple the torque converter and the variator from the input drive, wherein the disconnect clutch includes a portion of the impeller shell located radially outward of at least one impeller blade;

switching the rotation reversing device between a neutral position N, and one of a forward driving position D, and a reverse driving position R;

operating the disconnect clutch to couple the torque converter and the variator to the input drive to enable a selected one of forward driving and reverse driving; and operating a bridging clutch positioned within the housing of the torque converter between a turbine shell and the impeller shell to selectively block or bridge the torque converter, wherein the bridging clutch includes the portion of the impeller shell and a portion of the turbine shell located radially outward of at least one turbine blade, wherein the portion of the impeller shell directly contacts the portion of the turbine shell when the bridging clutch is closed, and wherein the portion of the impeller shell located radially outward of the at least one impeller blade is a friction member for both the disconnect clutch and the bridging clutch.

* * * * *